DIVERSITY RECEIVING SYSTEM

Filed March 14, 1960 2 Sheets-Sheet 1

INVENTORS.
ROBERT T. ADAMS
BARRY M. MINDES
BY Alfred C. Hill
AGENT

DIVERSITY RECEIVING SYSTEM

Filed March 14, 1960 2 Sheets-Sheet 2

INVENTORS.
ROBERT T. ADAMS
BY BARRY M. MINDES
Alfred C. Hill
AGENT

United States Patent Office 3,069,630

Patented Dec. 18, 1962

3,069,630

DIVERSITY RECEIVING SYSTEM

Robert T. Adams, Short Hills, N.J., and Barry M. Mindes, New York, N.Y., assignors to International Telephone and Telegraph Corporation, Nutley, N.J., a corporation of Maryland Filed Mar. 14, 1960, Ser. No. 14,955
20 Claims. (Cl. 328—133)

This invention relates to diversity receiving systems and more particularly to predetection signal combining systems therefor.

A predetection signal combining system known as an equal-gain or phase combining system has been employed with great success in over-the-horizon communication systems. In this combiner system, a pair of received diversity signals are applied to individual signal channels and translated to a common frequency, such as a predetermined intermediate frequency. The common frequency diversity signals are coupled to a signal combiner such as a resistor or hybrid circuit, to provide a single output signal having diversity advantage. Prior to the combiner the diversity signals are coupled to a phase comparator to compare the phase difference therebetween and produce a control signal proportional to this phase difference. This phase control signal is then coupled to an oscillator contained in at least one of the signal channels to correct the phase of the signal generated in this oscillator to thereby dispose the diversity signals in a predetermined phase relationship with respect to each other for inphase combining of the diversity signals in the combiner.

An object of the present invention is to provide a circuit to control the phase of a signal with respect to a reference phase without resort to the usual automatic phase control feedback loop.

Another object of this invention is to provide a predetection signal combining system to combine a plurality of signals inphase eliminating automatic phase control feedback loop employed in the predetection signal combining system described hereinabove.

A further object of this invention is to provide a predetection signal combining system synthesizing an output signal inphase with a reference phase having a magnitude directly proportional to the sum of the magnitude of a plurality of input signals each having varying phase with respect to the reference phase and each other.

A feature of this invention is the provision of a phase control system including first and second circuits coupled in parallel to the output of a signal source and a combining means coupled to the output of the first and second circuits to combine the output signals therefrom to provide a resultant signal. A control means is coupled to the first and second circuits and the output of the combining means to control the amplitude of the output signals of the first and second circuits to render the amplitude of the resultant signal equal to the amplitude of the input signal and to dispose the resultant signal inphase with a reference phase.

Another feature of this invention is the provision of a predetection signal combining system including one of the above-described phase control systems for each source of input signals and a means to combine the resultant signals of each phase control system. For this system each phase control system is modified to connect the control means thereof to the means combining the resultant signals rather than means combining the output signals of the first and second circuits. The combined resultant signals establish the reference phase for each phase control system.

Still another feature of this invention is the provision of a first phase comparator responding to the associated input signal and a signal having a reference phase to cooperate in dividing the associated input signal into quadrature components inphase with the reference phase having an amplitude proportional to the cosine of the phase angle between the associated input signal and the reference phase and a second phase comparator responding to the associated input signal phase shifted 90 degrees and the signal inphase with the reference phase to cooperate in dividing the 90 degree phase shifted associated input signal into quadrature components, the quadrature component inphase with the reference phase having an amplitude proportional to the sine of the phase angle between the associated input signal and the signal inphase with the reference phase. When the inphase quadrature components produced by the first and second phase comparators are combined inphase, the resultant signal is equal in magnitude to the magnitude of the associated input signal and provides at least a component of the signal inphase with the reference phase.

The above-mentioned and other features and objects of this invention will become more apparent by reference to the following description taken in conjunction with the accompanying drawings, in which.

Figure 1:
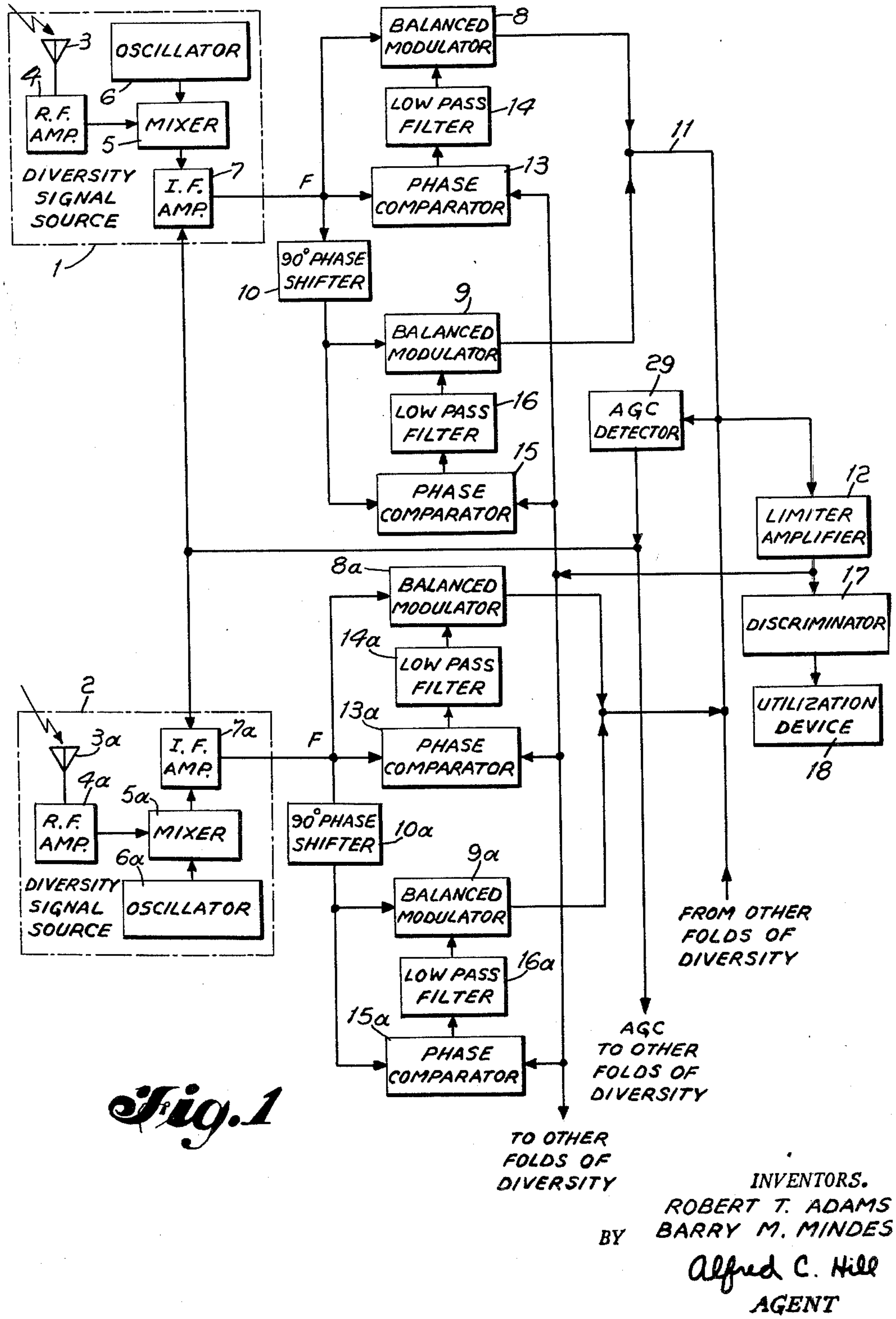
FIG. 1 is a schematic diagram in block form of a diversity receiving system utilizing the predetection signal combining system in accordance with the principles of this invention.

Referring to FIG. 1, there is illustrated therein a diversity receiving system including a plurality of diversity signal sources 1 and 2 coupled to the signal combining system of this invention. Although only two sources of diversity signals are illustrated it is to be understood as indicated in FIG. 1 that any number of folds of diversity (diversity signals) may be employed with the predetection combining system of this invention, the number of folds depending upon the reliability required. The diversity receiving system incorporating the predetection combining system of this invention may be employed with any of the well known types of diversity systems utilizing well known diversity techniques. For instance, space, polarization and frequency diversity techniques are directly applicable to the system illustrated in FIG. 1. By providing the appropriate time delay at the output of one of the sources, the receiving arrangement of FIG. 1 would be applicable to a time diversity system. The combining arrangement of FIG. 1 likewise would be applicable to the relatively new diversity technique known as angle diversity.

The phase control system coupled to source 1 will be described hereinbelow in greater detail, it being understood that the phase control system coupled to source 2 and any other source will include the same components and operate in an identical manner to enable the inphase combining of the plurality of signals of a multifold diversity receiver. Components in source 2 and the phase control system coupled thereto will have the reference character of their counterpart in source 1 and its associated phase control system applied thereto but followed by the letter "*a*."

As depicted in FIG. 1, diversity signal source 1 may include an antenna 3 which receives energy in the form of electromagnetic waves for application to a radio frequency amplifier 4. The signal output therefrom is coupled to mixer 5 for heterodyning with the signal of oscillator 6 to provide a signal at the desired intermediate frequency for amplification in intermediate frequency amplifier 7. The signals to be combined must have the same center frequency. Thus, the output of intermediate frequency amplifiers 7 and 7a must be at the same frequency as indicated by the letter F on the output lead of sources 1 and 2. This common frequency is readily obtained regardless of the techniques employed by appropriately adjusting the frequency of the oscillators 6 and 6a.

The signal output of source 1 having a phase varying with respect to a reference phase is coupled to a first circuit which includes therein a translation means illustrated in one form thereof as a balanced modulator 8. The signal at the output of source 1 is likewise coupled to a second circuit having a second translation means therein illustrated in one form thereof as a balanced modulator 9. The signal coupled to the input of balanced modulator 9 is disposed in a 90 degree phase relationship with respect to the signal input to balanced modulator 8 by means of the 90 degrees phase shifter 10 coupled to the output of source 1. The outputs of balanced modulators 8 and 9 after being operated thereupon in a manner to be described hereinbelow are coupled to a common output means, illustrated to be conductor 11 to provide a single resultant signal which is inphase with the reference phase and has an amplitude equal to the amplitude of the signal at the output of source 1. These phase and amplitude relationships of the resultant signal are provided by an arrangement coupled to balanced modulators 8 and 9 and the output of a signal combiner, such as limiter-amplifier 12, coupled to conductor 11 which controls the amplitude of the output signal from balanced modulators 8 and 9.

In accordance with the principles of this invention, the reference phase is the phase of the output signal from limiter-amplifier 12. To control the output signal of balanced modulators 8 and 9, there is provided a phase comparator 13 which compares the phase of the output signal of source 1 with the phase of the output signal of limiter-amplifier 12, in other words, the reference phase, to provide a control signal having an amplitude proportional to the phase difference detected in phase comparator 13. The output of phase comparator 13 is coupled through low pass filter 14 to balanced modulator 8 to divide the signal of source 1 into quadrature components with the quadrature component inphase with the reference phase comparator 13. Phase comparator 15 is utilized to compare the phase difference between the output of phase shifter 10, in other words, the output of source 1 shifted 90 degrees, with the output signal of limiter-amplifier 12 to provide a second control signal having a value proportional to the phase difference detected in comparator 13. The second control signal is coupled through low pass filter 16 to balanced modulator 9 to divide the signal at the output of phase shifter 10 into quadrature components with the quadrature component inphase with the reference phase having an amplitude proportional to the detected phase difference in phase comparator 13. The sum of the magnitude of the inphase quadrature component as the output of modulator 9 and the magnitude of the inphase quadrature component at the output of modulator 8 as found on conductor 11 is equal to the magnitude of the signal of source 1.

Since the output signal of limiter-amplifier 12 is used as a reference for the phase control circuits coupled to each signal source and the resultant output signals therefrom are inphase with the output signal of limiter-amplifier 12, these resultant signals are added together cophasally at the input of limiter-amplifier 12 and result in a single combined output signal therefrom having the desired diversity advantage. The combined output signal is then coupled to a discriminator 17 for recovery of the intelligence thereon for utilization in a utilization device 18.

The purpose of low pass filters 14 and 16 coupled, respectively, to the output of phase comparators 13 and 15 are for the purpose of removing noise from the control signals and also to prevent the control signals from following rapid changes in phase, such as will occur due to angular modulation present on the input signals. Thus, the control signal at the output of the phase comparators will be able to follow the variations produced in signal strength resulting from multipath effects but yet will not follow the angular modulation components of the input signal.

Figure 2:
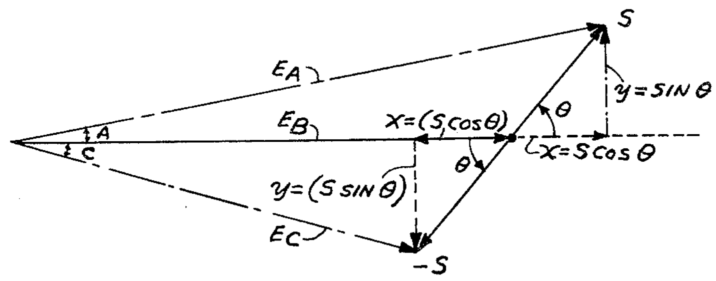
FIGS. 2, 3 and 4 are vector diagrams useful in explaining the operation of the predetection combining system of FIG. 1.
Figure 3:
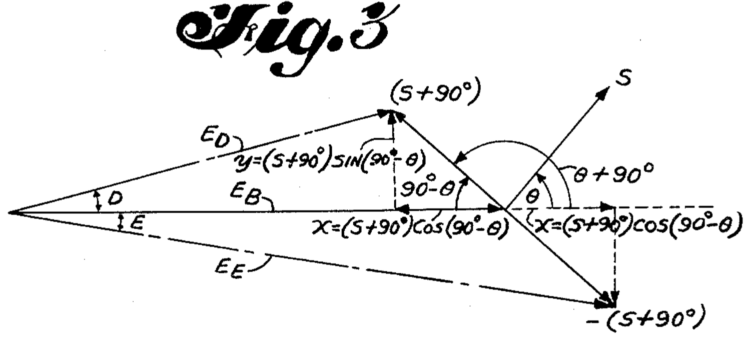
Figures 4, 5:
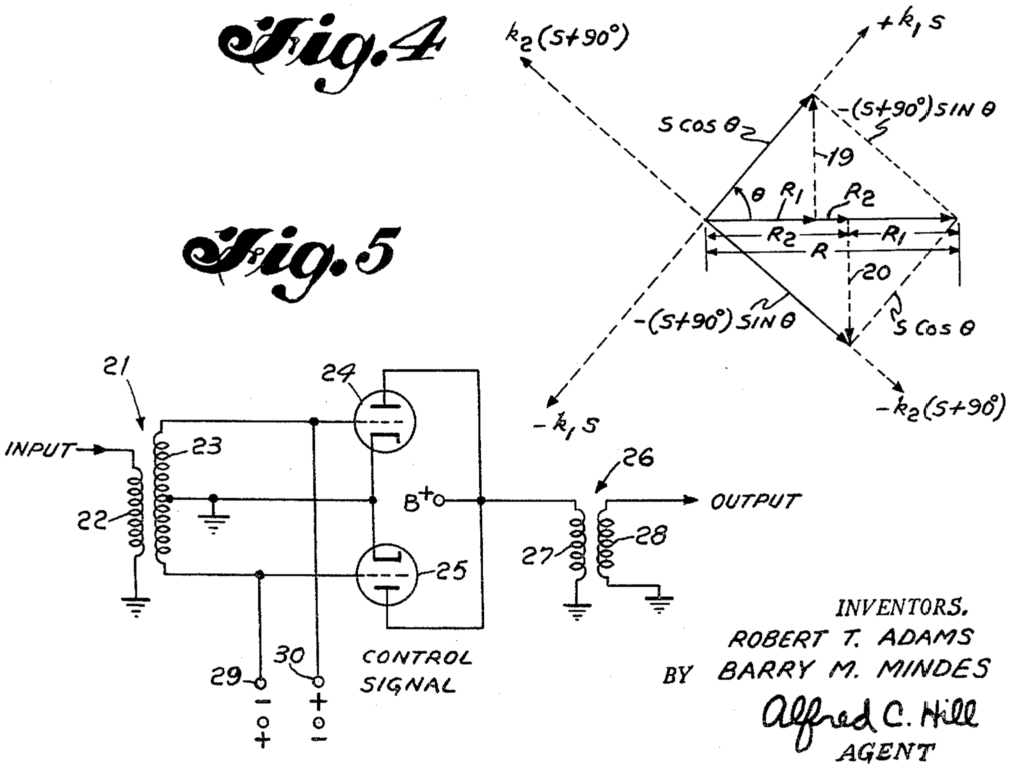
FIG. 5 is a schematic diagram illustrating one form of balanced modulator which may be employed in the system of FIG. 1.

Referring to FIGS. 2, 3 and 4, there is illustrated therein three vector diagrams which will be employed in conjunction with FIG. 1 to explain in greater detail the operation of the phase control system of this invention enabling the inphase combining of a plurality of diversity signals prior to modulation detection. FIG. 2 is a vector diagram representative of the operation of phase comparator 13 while FIG. 3 is a vector diagram of the operation of phase comparator 15. FIG. 4 is a vector diagram illustrating the combined action of balanced modulators 8 and 9 in conjunction with their associated phase comparators 13 and 15, respectively, to provide the resultant signal on conductor 11. The minus signs and the (+90°) notations employed in the vector diagrams are for the purpose of showing direction of a quantity and the phase displacement of the input signal and do not have anything to do with the magnitude of the signal or the phase displacement of the resultant signals.

Referring with greater particularity to FIGS. 1 and 2, the output of limiter-amplifier 12 is illustrated as the vector $E_B$ and the input signal applied to phase comparator 13 is illustrated as a vector S disposed from the reference phase, vector $E_B$, by an angle $\theta$. Angle $\theta$ equals the average phase angle between the reference signal and the input signal, since the phase angle of vector S will vary in accordance with the angular modulation present thereon. In the operation of the combining system, it is assumed that the absolute value $E_B$ is very much greater than the absolute value of the signal S. This assumption is provided practically by the operation of limiter-amplifier 12. Thus, the following conditions are present:

$$\text{Angle } A=0 \text{ then } \cos A=1$$
$$\text{Angle } C=0 \text{ then } \cos C=1$$

where cos is equal to cosine. Under these conditions, the control signal developed at the output of comparator 13 will be equal to $E_A-E_B$ or $E_C-E_B$ and it can be shown that these control signals are proportional to the phase angle $\theta$ and, in fact, proportional to cos $\theta$ as follows:

$$\cos\theta=\frac{x}{S}$$
$$x=S\cos\theta$$
$$\sin\theta=\frac{y}{S}$$
$$y=S\sin\theta$$

where sin is equal to sine.

$$\cos A=\frac{E_B+S\cos\theta}{E_A}$$
$$E_A=E_B+S\cos\theta$$
$$E_A-E_B=S\cos\theta$$

and $$\cos C=\frac{E_B-S\cos\theta}{E_C}$$
$$E_C=E_B-S\cos\theta$$
$$E_C-E_B=-S\cos\theta$$

Thus, from the above trigonometric relationships relative to FIG. 2 the output of phase comparator 13 is a D.C. quantity varying in accordance with cos $\theta$.

Referring to FIG. 3, we observe therein a vector diagram representing the operation that takes place in phase comparator 15. Again the vector $E_B$ is utilized as the reference with the input signal to phase shifter 10 indicated by the vector S displaced from the reference phase by angle $\theta$. The action of phase shifter 10 is to displace the vector S by 90 degrees as is indicated by the vector labeled $(S+90°)$ displaced from the reference phase by angle $(\theta+90°)$. The same assumptions that were made hereinabove with respect to FIG. 2, as made practical by the action of limiter-amplifier 12, are likewise made with respect to the action taking place in phase comparator 15 as illustrated in FIG. 3. Namely, $$\text{Angle } D=0;\ \cos D=1$$

$$\text{Angle } E=0;\ \cos E=1$$

The control signal generated at the output of phase comparator 15 is equal to $E_D-E_B$ or $E_E-E_B$ and it can be shown that these control signals are proportional to the phase angle $\theta$ and, in fact, proportional to sin $\theta$ as follows:

$$\cos(90°-\theta)=\frac{x}{(S+90°)}$$

$$x=(S+90°)\cos(90°-\theta)$$

$$\sin(90°-\theta)=\frac{y}{(S+90°)}$$

$$y=(S+90°)\sin(90°-\theta)$$

$$\cos D=\frac{E_B-(S+90°)\cos(90°-\theta)}{E_D}$$

$$E_D=E_B-(S+90°)\cos(90°-\theta)$$

$$E_D-E_B=-(S+90°)(\cos 90°\cos\theta+\sin 90°\sin\theta)$$

$$E_D-E_B=-(S+90°)\sin\theta$$

$$|(S+90°)|=|S|$$

$$E_D-E_B=-S\sin\theta$$

and $$\cos E=\frac{E_B+(S+90°)\cos(90°-\theta)}{E_E}$$

$$E_E=E_B+(S+90°)\cos(90°-\theta)$$

$$E_E-E_B=(S+90°)(\cos 90°\cos\theta+\sin 90°\sin\theta)$$

$$E_E-E_B=(S+90°)\sin\theta$$

$$|(S+90)|=|S|$$

$$E_E-E_B=S\sin\theta$$

Thus, from the above trigonometric relationships relative to FIG. 3 the output of phase comparator 15 is a D.C. quantity varying in accordance with sin $\theta$.

Referring now to FIG. 4, there is illustrated therein a vector diagram representing the composite operation of balanced modulators 8 and 9 to provide a resultant signal on conductor 11 having a phase equal to the phase of the output signal of limiter-amplifier 12 and having an amplitude equal to the amplitude of the input signal S.

The dotted vectors labeled $+k_1S$ and $-k_1S$ represent the plus and minus vector values of the signals applied at the input of balanced modulator 8 while the dotted vectors $k_2$ $(S+90°)$ and the dotted vector labeled $-k_2$ $(S+90°)$ represent the plus and minus vector quantities of the signal applied to balanced modulator 9. Through the action of phase comparator 13 the amplitude of the input signal coupled to balanced modulator 8 is controlled to provide a signal having a magnitude proportional to the cos $\theta$, the control signal coupled to modulator 8 from phase comparator 13 as is indicated by the vector S cos $\theta$. The action of the control signal from comparator 15 as applied to modulator 9 results in the control of the amplitude of the signal applied at the input thereof to provide a signal whose amplitude is proportional to the sin $\theta$ as indicated by the vector $-(S+90°)\sin\theta$. Thus, we have in balanced modulators 8 and 9 two vectors that are mutually perpendicular one to the other whose vector sum is vector R. Thus, one way of looking at the operation of the phase control system of this invention is that through the action of the balanced modulators 8 and 9 and their associated phase comparators 13 and 15 there were produced two mutually perpendicular vectors each having their amplitude controlled by a signal proportional to the phase difference between the reference phase and the input signal to provide on conductor 11 a resultant signal having an amplitude equal to the amplitude of the input signal and in phase with the reference phase.

Another way of looking at the operation which takes place in the circuit of this invention is that the action of the balanced modulators 8 and 9 not only reduce the amplitude of the signal applied at their inputs in proportion to the phase angle $\theta$, but also divide the reduced amplitude signals into quadrature components. Thus, the vector $S\cos\theta$ in balanced modulator 8 is divided into a quadrature component vector $R_1$ inphase with the reference phase and a quadrature component vector 19 while the vector $-(S+90°)\sin\theta$ in balanced modulator 9 is divided into a quadrature component vector $R_2$ inphase with the reference phase and a quadrature component vector 20. The resultant signal on conductor 11, therefore, is the sum of $R_1+R_2$, or as indicated, R, while the quadrature components 19 and 20 are cancelled due to their equal magnitude but opposite phase relationship.

The trigonometric relations set forth hereinbelow with respect to FIG. 4 prove in four different ways that the resultant R is equal to the input signal S at a zero phase angle with respect to the reference phase. The trigonometric relations under A below indicate that the amplitude of the quadrature components of the input signal are adjusted by the control signal until the vector sum thereof is equal in amplitude to the amplitude of the input signal and inphase with the reference phase. The trigonometric relations under B indicate that effectively the action of the balanced modulators 8 and 9 is to reduce the amplitude of the signals applied to their input to an amplitude equal to the control signals ($S\cos\theta$ and $S\sin\theta$) from the phase comparators 13 and 15, respectively, and then divide these signals to produce an output signal from each of the modulators having an amplitude equal to the amplitude of the quadrature component of the reduced amplitude signal therein inphase with the reference phase. In deriving the following relationships it should be remembered that $$|[-(S+90°)]|=|S|$$

A $$R^2=(S\cos\theta)^2+(-(S+90°)\sin\theta)^2$$

$$R^2=S^2\cos^{2\theta}+S^2\sin^{2\theta}$$

$$R^2=S^2(\cos^{2\theta}+\sin^{2\theta})$$

$$\cos^{2\theta}+\sin^{2\theta}=1$$

$$R=S\underline{/0°}$$

B $$\cos\theta=\frac{R_1}{S\cos\theta}$$

$$R_1=S\cos^{2\theta}$$

$$\cos(90°-\theta)=\frac{R_2}{-(S+90°)\sin\theta}$$

$$\cos(90°-\theta)=\cos 90°\cos\theta+\sin 90\sin\theta=\sin\theta$$

$$\sin\theta=\frac{R_2}{S\sin\theta}$$

$$R_2=S\sin^{2\theta}$$

$$R=R_1+R_2=S\cos^{2\theta}+S\sin^{2\theta}$$

$$R=S(\cos^{2\theta}+\sin^{2\theta})$$

$$\cos^{2\theta}+\sin^{2\theta}=1$$

$$R=S\underline{/0°}$$

C $$\cos\theta = \frac{S\cos\theta}{R}$$

$$R = \frac{S\cos\theta}{\cos\theta} = S\underline{/0^\circ}$$

D $$\sin\theta = \frac{-(S+90^\circ)\sin\theta}{R}$$

$$R = \frac{S\sin\theta}{\sin\theta} = S\underline{/0^\circ}$$

Referring to FIG. 5, there is illustrated therein a schematic diagram of one form of balanced modulators that could be used for modulators 8 and 9. In accordance with this invention, the signal from source 1 or phase shifter 10 would be coupled to transformer 21 having a primary winding 22 and a center tapped secondary winding 23 with the center tap connected to ground as illustrated. The signals applied at the input terminal are coupled through the transformer 21 to the grids of tubes 24 and 25 inphase opposition, that is, 180 degrees out of phase. The anodes of tubes 24 and 25 are coupled to an output transformer 26 including a primary winding 27 and a secondary winding 28 connected as illustrated. The cathodes of tubes 24 and 25 are connected to ground or to an appropriate voltage source so that with no control voltage on the grids of tubes 24 and 25 both of these tubes will be conducting. It should be further pointed out that the control signal as applied from the phase comparator circuits are coupled to the balanced modulators in a push-pull arrangement. In other words, if the control signal is a plus value, it is applied as a plus value to one of the tubes and a negative value to the other of the tubes and if the control signal is a negative value the polarity of the signal applied to the tubes will be reversed. This is indicated by the plus and minus signs associated with the two control signal terminals 29 and 30 in FIG. 5. If there is no control signal, both tubes 24 and 25 will conduct thereby providing at the output of tube 24 a negative version of a positive input signal applied to the grid thereof and at the output of tube 25 a positive version of the negative input signal applied to the grid thereof. Since both of these tubes 24 and 25 are conducting equally and providing waveforms of opposite polarity the resultant output of the circuit will be zero due to the cancellation that takes place in the primary winding 27 of transformer 26. Now let us assume that a negative control signal is coupled to tube 24 and a positive control signal is coupled to tube 25. Under these conditions, tube 24 will be rendered nonconductive and tube 25 will remain conducting providing at the output of tube 24 no voltage and at the output of tube 25, a positive voltage equal in magnitude to $R_1$ or $R_2$, depending upon which of the circuits the balanced modulator is located in, but at a phase angle of 180 degrees with respect to the reference phase due to the 180 degree phase relationship which takes place in transformer 26. Hence, the positive signal at the output of tube 25 is converted to a negative signal at the output of the circuit, namely, the secondary winding 28 of transformer 26. Now if a positive control signal is coupled to tube 24 and a negative control signal is coupled to tube 25 the conduction conditions will be reversed, that is, tube 25 will be rendered nonconductive and tube 24 will remain conducting. The output signal of tube 24 will be a negative version of the input signal coupled thereto and no output from tube 25. The resultant output at secondary winding 28 will be equal to $R_1$ or $R_2$ depending upon whether the circuit is coupled to the output of source 1 or phase shifter 10 at a phase angle of zero degrees relative to the reference phase. The magnitude of the control signal determines the reduction in magnitude of the signal applied to the input of the tubes 24 and 25 and, hence, the magnitude of the quadrature component thereof inphase with the reference which is coupled to the common circuit means for cophasal addition with the appropriate quadrature component of its coacting balanced modulator to provide a resultant signal equal to the amplitude of the input signal and inphase with the reference phase.

In summary, the signal combining system of this invention employs a phase control circuit in which the input signal is split into quadrature components each of which is operated upon by a control signal proportional to the phase relation of the signal with respect to a reference phase in a translation device, such as a balanced modulator to synthesize a resultant signal having the magnitude of the input signal and inphase with respect to a reference phase, the reference phase being supplied by the combined output of the balanced modulators. By employing a plurality of these arrangements to operate on each of a plurality of input diversity signals, there is provided a single output signal having a magnitude substantially equal to the sum of the magnitude of each of the signals coupled to the diversity receiver at a phase angle of zero with respect to the reference phase, the reference phase for this arrangement being provided by the single output signal.

The action of the predetection combiner described hereinabove employing a balanced modulator as the translation means is similar to that of a ratio squared combiner in that weak signals are suppressed more than stronger signals if the balanced modulator is a product-taking device (multiplier) providing an output signal proportional to the product of the signals applied to the inputs thereof. In the present system, the output signal is proportional to the square of the signal of the source of signals since the control signal applied to one input of the balanced modulator is directly proportional to the amplitude of the input signal applied to the other input of the balanced modulator. Thus, the weak signals do not contribute to the single output signal in the same proportion as the stronger signals, thereby approximating the ratio squared combining techniques which have heretofore been employed mainly in post-detection signal combining systems. By so reducing the weaker signals in accordance with the ratio squared combining techniques, the contribution of noise from source or channel of this weaker signal is reduced and, hence, the overall combined signal-to-noise ratio is improved. By utilizing a balanced mixer as the translation means in place of the balanced modulator, it is possible to obtain linear addition of the plurality of diversity signals, that is, an output signal from the balanced mixer which is linearly related to the signals applied to the inputs thereof.

The phase control system employed in the signal combining arrangement of this invention is a forward-locking control system and is started much in the same manner as an oscillator starts its operation. That is, a small amount of noise or other signal will leak through limiter-amplifier 12 to its output which will have a component equal in frequency to the signal applied from the signal sources to start the circuit into operation. Once started there will be provided more and more signals at the output of limiter-amplifier 12 until such time as the signal reaches the desired operating level.

As in the operation of equal-gain and most other forms of predetection combining systems, it is preferred that the receiver gain from the antenna to the point of combining be precisely constant or proportional in all channels. To accomplish this, automatic gain control systems have been employed and such a system is indicated in FIG. 1 including AGC detector 29 whose output signal, proportional to the amplitude of the combined signals, is coupled to IF amplifiers 7 and 7*a* of sources 1 and 2 to control the gain of these sources equally. The output of AGC detector 29 would be coupled to similar amplifiers of the other folds of diversity coupled to this combining arrangement.

While we have described above the principles of our invention in connection with specific apparatus, it is to be clearly understood that this description is made only by way of example and not as a limitation to the scope of our invention as set forth in the objects thereof and in the accompanying claims.

We claim:

1. An automatic phase control system comprising a source of input signals having varying phase with respect to a reference phase, a first circuit coupled to said source to produce a first output signal, a second circuit coupled to said source to produce a second output signal, means coupled to the output of said first and second circuits to combine said first and second output signals to provide a resultant signal, and means coupled to said first and second circuits and the output of said combining means to control the amplitude of said first and second output signals to render the amplitude of said resultant signal equal to the amplitude of said input signals and to dispose said resultant signal inphase with said reference phase.

2. An automatic phase control system comprising a source of input signals having varying phase with respect to a reference phase, a first circuit coupled to said source to produce a first output signal, a second circuit coupled to said source to produce a second output signal, means coupled to the output of said first and second circuits to combine said first and second output signals to provide a resultant signal, and means coupled to said first and second circuits and the output of said combining means to render the amplitude of said first and second output signals proportional to the phase difference between said input signals and said reference phase to control the amplitude of said resultant signal to be equal to the amplitude of said input signals and to dispose said resultant signal inphase with said reference phase.

3. An automatic phase control system comprising a source of input signals having varying phase with respect to a reference phase, a first circuit coupled to said source to produce a first output signal, a second circuit including a 90° phase shifting means coupled to said source to produce a second output signal, means coupled to the output of said first and second circuits to combine said first and second output signals to provide a resultant signal, and means coupled to said first and second circuits and the output of said combining means to control the amplitude of said first and second output signals to render the amplitude of said resultant signal equal to the amplitude of said input signals and to dispose said resultant signal inphase with said reference phase.

4. An automatic phase control system comprising a source of input signals having varying phase with respect to a reference phase, a first circuit coupled to said source to produce a first output signal, a second circuit including a 90° phase shifting means coupled to said source to produce a second output signal, means coupled to the output of said first and second circuits to combine said first and second output signals to provide a resultant signal, and means coupled to said first and second circuits and the output of said combining means to render the amplitude of said first and second output signals proportional to the phase difference between said input signals and said reference phase to control the amplitude of said resultant signal to be equal to the amplitude of said input signals and to dispose said resultant signal inphase with said reference phase.

5. An automatic phase control system comprising a plurality of sources of input signals each having varying phase with respect to a reference phase, a first circuit coupled to each of said sources to produce a first output signal, a second circuit coupled to each of said sources to produce a second output signal, first means coupled to the output of each of said first and second circuits to combine said first and second output signals to provide a resultant signal, a second means coupled to the output of each of said first means to combine each of said resultant signals, and a third means coupled to each of said first and second circuits and the output of said second means to control the amplitude of each of said first and second output signals to render the amplitude of each of said resultant signals equal to the amplitude of the input signals of the associated one of said sources and to dispose each of said resultant signals inphase with said reference phase.

6. An automatic phase control system comprising a plurality of sources of input signals each having varying phase with respect to a reference phase, a first circuit coupled to each of said sources to produce a first output signal, a second circuit coupled to each of said sources to produce a second output signal, a first means coupled to the output of each of said first and second circuits to combine each of said first and second output signals to provide a resultant signal, a second means coupled to the output of each of said first means to combine each of said resultant signals, and third means coupled to each of said first and second circuits and the output of said second means to control the amplitude of each of said first and second output signals to be proportional to the phase difference between the input signal of the associated one of said sources and said reference phase to adjust the amplitude of each of said resultant signals to be equal to the amplitude of the input signals of said associated one of said sources and to dispose each of said resultant signals inphase with said reference phase.

7. An automatic phase control system comprising a plurality of sources of input signals each having varying phase with respect to a reference phase, a first circuit coupled to each of said sources to produce a first output signal, a second circuit including a 90° phase shifting means coupled to each of said sources to produce a second output signal, a first means coupled to the output of each of said first and second circuits to combine each of said first and second output signals to provide a resultant signal, a second means coupled to the output of each of said first means to combine each of said resultant signals, and a third means coupled to each of said first and second circuits and the output of said second means to control the amplitude of each of said first and second output signals to render the amplitude of each of said resultant signals equal to the amplitude of the input signals of the associated one of said sources and to dispose each of said resultant signals inphase with said reference phase.

8. An automatic phase control system comprising a plurality of sources of input signals each having varying phase relation with respect to a reference phase, a first circuit coupled to each of said sources to produce a first output signal, a second circuit including a 90° phase shifting means coupled to each of said sourrces to produce a second output signal, a first means coupled to the output of each of said first and second circuits to combine each of said first and second output signals to provide a resultant signal, a second means coupled to each of said first means to combine each of said resultant signals, and a third means coupled to each of said first and second circuits and the output of said second means to control the amplitude of each of said first and second output signals to be proportional to the phase difference between the input signals of the associated one of said sources and said reference phase to adjust the amplitude of each of said resultant signals to be equal to the amplitude of the input signal of said associated one of said sources and to dispose each of said resultant signals inphase with said reference phase.

9. An automatic phase control system comprising a source of input signals having varying phase with respect to a reference phase, a first circuit coupled to said source to produce a first output signal a second circuit coupled to said source to produce a second output signal, and a means coupled to the output of said first and second circuits to combine said first and second output signals to provide a resultant signal having an amplitude substantially equal to the amplitude of said input signals and inphase with said reference phase, said first circuit including means coupled to said combining means responsive to said resultant signal and said input signals to provide said first output signal and said second circuit including means coupled to said combining means responsive to said resultant signal and said input signals to provide said second output signal perpendicular to said first output signal, said resultant signal being the vector sum of said first and second output signals.

10. An automatic phase control system comprising a source of input signals having varying phase with respect to a reference phase, a first circuit coupled to said source to produce a first output signal, a second circuit coupled to said source to produce a second output signal, and a means coupled to the output of said first and second circuits to combine said first and second output signals to provide a resultant signal having an amplitude substantially equal to the amplitude of said input signals and inphase with said reference phase, said first circuit including means coupled to said combining means responsive to said resultant signal and said input signals to provide said first output signal disposed at an angle with respect to said reference phase equal to the phase difference between said input signal and said resultant signal and having an amplitude proportional to said phase difference and said second circuit including means coupled to said combining means responsive to said resultant signal and said input signal to provide said second output signal perpendicular to said first output signal and having an amplitude proportional to said phase difference, said resultant signal being the vector sum of said first and second output signals.

11. An automatic phase control system comprising a plurality of sources of input signals each having varying phase with respect to a reference phase, a circuit coupled to each of said sources to produce a resultant signal, and a first means coupled to the output of each of said circuits to combine each of said resultant signals to provide a combined signal having an amplitude proportional to the sum of the amplitudes of the input signals of each of said sources and inphase with said reference phase, each of said circuits including a first signal path coupled to the associated one of said sources to produce a first output signal, a second signal path coupled to said associated one of said sources to produce a second output signal, and a second means coupled to the output of said first and second paths to combine said first and second output signals to provide the associated one of said resultant signals having an amplitude substantially equal to the amplitude of the input signal of said associated one of said sources and inphase with said reference phase, said first path including means coupled to said first means responsive to said combined signal and the input signal of said associated one of said sources to provide said first output signal and said second path including means coupled to said first means responsive to said combined signal and the input signal of said associated one of said sources to provide said second output signal perpendicular to said first output signal, said associated one of said resultant signals being the vector sum of said first and second output signals.

12. An automatic phase control system comprising a plurality of sources of input signals each having varying phase with respect to a reference phase, a circuit coupled to each of said sources to produce a resultant signal, and a first means coupled to the output of each of said circuits to combine each of said resultant signals to provide a combined signal having an amplitude proportional to the sum of the amplitude of the input signals of each of said sources and inphase with said reference phase, each of said circuits including a first signal path coupled to the associated one of said sources to produce a first output signal, a second signal path coupled to said associated one of said sources to produce a second output signal, and a second means coupled to the output of said first and second paths to combine said first and second output signals to provide the associated one of said resultant signals having an amplitude substantially equal to the amplitude of the input signal of said associated one of said sources and inphase with said reference phase, said first path including means coupled to said first means responsive to said combined signal and the input signal of said associated one of said sources to provide said first output signal disposed at an angle from said reference phase equal to the phase difference between the input signal of said associated one of said sources and said associated one of said resultant signals and having an amplitude proportional to said phase difference and said second path including means coupled to said first means responsive to said combined signal and the input signal of said associated one of said sources to provide said second output signal perpendicular to said first output signal and having an amplitude proportional to said phase difference, said associated one of said resultant signals being the vector sum of said first and second output signals.

13. A diversity receiving system comprising a plurality of diversity signals each having varying phase with respect to a reference phase and to each other, a first circuit coupled to each of said sources to produce a first output signal, a second circuit coupled to each of said sources to produce a second output signal, first means coupled to the output of each of said first and second circuits to combine each of said first and second output signals to provide a resultant signal, a second means coupled to the output of each of said first means to combine each of said resultant signals, a third means coupled to each of said first and second circuits and the output of said second means to control the amplitude of each of said first and second output signals to render the amplitude of the associated one of said resultant signals equal to the amplitude of the diversity signals of the associated one of said sources and to dispose the associated one of said resultant signals inphase with said reference phase, and fourth means coupled to the output of said second means to utilize said combined resultant signals.

14. A diversity receiving system comprising a plurality of sources of diversity signals each having varying phase with respect to a reference phase and to each other, a first circuit coupled to each of said sources to produce a first output signal, a second circuit coupled to each of said sources to produce a second output signal, a first means coupled to the output of each of said first and second circuits to combine each of said first and second output signals to provide a resultant signal, a second means coupled to the output of each of said first means to combine each of said resultant signals, a third means coupled to each of said first and second circuits and the output of said second means to render the amplitude of each of said first and second output signals proportional to the phase difference between the diversity signals of an associated one of said sources and said reference phase to adjust the amplitude of the associated one of said resultant signals to be equal to the amplitude of the diversity signals of the associated one of said sources and to dispose the associated one of said resultant signals inphase with said reference phase, and fourth means coupled to the output of said second means to utilize said combined resultant signals.

15. A diversity receiving system comprising a plurality of sources of diversity signals each having varying phase with respect to a reference phase and to each other, a first circuit coupled to each of said sources to produce a first output signal, a second circuit including a 90 degree phase shifting means coupled to each of said sources to produce a second output signal, a first means coupled to the output of each of said first and second circuits to combine each of said first and second output signals to provide a resultant signal, a second means coupled to the output of each of said first means to combine each of said resultant signals, a third means coupled to each of said first and second circuits and the output of said second means to control the amplitude of each of said first and second output signals to render the amplitude of the associated one of said resultant signals equal to the amplitude of the diversity signals of the associated one of said sources and to dispose the associated one of said resultant signals inphase with said reference phase, and fourth means coupled to the output of said second means to utilize said combined resultant signals.

16. A diversity receiving system comprising a plurality of sources of diversity signals each having varying phase with respect to a reference phase and to each other, a first circuit coupled to each of said sources to produce a first output signal, a second circuit including a 90 degree phase shifting means coupled to each of said sources to produce a second output signal, a first means coupled to the output of each of said first and second circuits to combine each of said first and second output signals to provide a resultant signal, a second means coupled to each of said first means to combine each of said resultant signals, a third means coupled to each of said first and second circuits and the output of said second means to render the amplitude of each of said first and second output signals proportional to the phase difference between the diversity signals of an associated one of said sources and said reference phase to adjust the amplitude of the associated one of said resultant signals to be equal to the amplitude of the diversity signals of the associated one of said sources and to dispose the associated one of said resultant signals inphase with said reference phase, and a fourth means coupled to the output of said second means to utilize said combined resultant signals.

17. A diversity receiving system comprising a plurality of sources of diversity signals each having varying phase with respect to a reference phase and to each other, a circuit coupled to each of said sources to produce a resultant signal, a first means coupled to the output of each of said circuits to combine each of said resultant signals to provide a combined signal having an amplitude proportional to the sum of the amplitudes of the diversity signals of each of said sources and inphase with said reference phase, and a second means coupled to the output of said first means to utilize said combined signal, each of said circuits including a first signal path coupled to the associated one of said sources to produce a first output signal, a second signal path coupled to said associated one of said sources to produce a second output signal, and a third means coupled to the output of said first and second paths to combine said first and second output signals to provide the associated one of said resultant signals having an amplitude substantially equal to the amplitude of the diversity signals of said associated one of said sources and inphase with said reference phase, said first path including means coupled to said first means responsive to said combined signal and the diversity signals of said associated one of said sources to provide said first output signal and said second path including means coupled to said first means responsive to said combined signal and the diversity signals of said associated one of said sources to provide said second output signal perpendicular to said first output signal, said associated one of said resultant signals being the vector sum of said first and second output signals.

18. A diversity receiving system comprising a plurality of sources of diversity signals each having varying phase with respect to a reference phase and to each other, a circuit coupled to each of said sources to produce a resultant signal, a first means coupled to the output of each of said circuits to combine each of said resultant signals to provide a combined signal having an amplitude proportional to the sum of the amplitudes of the diversity signals of each of said sources and inphase with said reference phase, and a second means coupled to the output of said first means to utilize said combined signals, each of said cicuits including a first signal path coupled to the associated one of said sources to produce a first output signal, a second signal path coupled to said associated one of said sources to produce a second output signal, and a third means coupled to the output of said first and second paths to combine said first and second output signals to provide the associated one of said resultant signals having an amplitude substantially equal to the amplitude of the diversity signals of said associated one of said sources and inphase with said reference phase, said first path including means coupled to said first means responsive to said combined signal and the diversity signals of said associated one of said sources to provide said first output signal disposed at an angle with respect to said reference phase equal to the phase difference between the diversity signals of said associated one of said sources and said associated one of said resultant signals and having an amplitude proportional to said phase difference and said second path including means coupled to said first means responsive to said combined signal and the diversity signals of said associated one of said sources to provide said second output signal perpendicular to said first output signal and having an amplitude proportional to said phase difference, said associated one of said resultant signals being the vector sum of said first and second output signals.

19. A diversity receiving system comprising a plurality of sources of diversity signals each having varying phase with respect to a reference phase and to each other, a circuit coupled to each of said sources to produce a resultant signal, a limiter-amplifier coupled to the output of each of said circuits to combine each of said resultant signals to provide a combined signal having an amplitude proportional to the sum of the amplitudes of said resultant signals and inphase with said reference phase, and means coupled to the output of said limiter-amplifier to utilize said combined signal, each of said circuits including a first translation means coupled to the associated one of said sources, a first phase comparison means coupled to said associated one of said sources and the output of said limiter-amplifier to produce a first control signal proportional to the phase difference between said combined signal and the diversity signals of said associated one of said sources, means to couple said first control signal to said first translation means to produce a first output signal having an amplitude proportional to said first control signal and inphase with said combined signal, a 90 degree phase shifter coupled to said associated one of said sources, a second translation means coupled to the output of said phase shifter, a second phase comparison means couple to the output of said phase shifter and the output of the said limiter-amplifier to produce a second control signal proportional to said phase difference, means coupling said second control signal to said second translation device to provide a second output signal having an amplitude proportional to said second control signal and inphase with said combined signal, and means coupled to the output of said first and second translation means to combine said first and second output signals to provide the associated one of said resultant signals having an amplitude equal to the amplitude of the diversity signals of said associated one of said sources and inphase with said combined signal.

20. A diversity receiving system comprising a plurality of sources of diversity signals each having varying phase with respect to a reference phase and to each other, a circuit coupled to each of said sources to produce a resultant signal, a limiter-amplifier coupled to the output of each of said circuits to combine each of said resultant signals to provide a combined signal having an ampltude proportional to the sum of the amplitudes of said resultant signals and inphase with said reference phase, and means coupled to the output of said limiter-amplifier to utilize said combined signal, each of said circuits including a first translation means coupled to the associated one of said sources, a first phase comparison means coupled to said associated one of said sources and the output of said limiter-amplifier to produce a first control signal equal to the amplitude of the diversity signals of said associated one of said sources multiplied by the cosine of the phase angle between said combined signal and the diversity signals of said associated one of said sources, a first low pass filter to couple said first control signal to said first translation means to provide a first output signal having an amplitude proportional to said first control signal and inphase with said combined signal, a 90 degree phase shifter coupled to said associated one of said sources, a second translation means coupled to the output of said phase shifter, a second phase comparison means coupled to the output of said phase shifter and the output of said limiter-amplifier to produce a second control signal equal to the amplitude of the diversity signals of said associated one of said sources multiplied by the sine of said phase angle, a second low pass filter to couple said second control signal to said second translation means to provide a second output signal having an amplitude proportional to said second control signal and inphase with said combined signal, and means coupled to the output of said first and second translation means to combine said first and second output signals to provide the associated one of said resultant signals having an amplitude equal to the amplitude of the diversity signals of said associated one of said sources and inphase with said combined signal.

References Cited in the file of this patent

UNITED STATES PATENTS 2,703,380 Fraser ---------------- Mar. 1, 1955